United States Patent
Yang et al.

(10) Patent No.: US 10,539,292 B2
(45) Date of Patent: Jan. 21, 2020

(54) OPTICAL DEVICE AND LUMINAIRE

(71) Applicant: SIGNIFY HOLDING B.V., Eindhoven (NL)

(72) Inventors: Xiu Yang, Eindhoven (NL); Caijie Yan, Eindhoven (NL); Gang Song, Eindhoven (NL); Wei Wang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 271 days.

(21) Appl. No.: 15/112,682

(22) PCT Filed: Jan. 20, 2015

(86) PCT No.: PCT/EP2015/050913
§ 371 (c)(1),
(2) Date: Jul. 19, 2016

(87) PCT Pub. No.: WO2015/110392
PCT Pub. Date: Jul. 30, 2015

(65) Prior Publication Data
US 2017/0002995 A1    Jan. 5, 2017

(30) Foreign Application Priority Data

Jan. 27, 2014 (WO) ................. PCT/CN2014/000106
Apr. 3, 2014 (EP) ...................................... 14163336

(51) Int. Cl.
*F21V 5/00* (2018.01)
*F21V 5/02* (2006.01)
(Continued)

(52) U.S. Cl.
CPC ................ *F21V 5/007* (2013.01); *F21V 5/02* (2013.01); *F21V 7/09* (2013.01); *F21V 5/046* (2013.01);
(Continued)

(58) Field of Classification Search
CPC . F21V 7/048; F21V 7/09; F21V 5/045; F21V 5/007; F21V 5/0485; F21V 5/04;
(Continued)

(56) References Cited

U.S. PATENT DOCUMENTS 5,155,666 A * 10/1992 Radford .................... B64F 1/20
362/145
7,118,236 B2 * 10/2006 Hahm ...................... H01L 33/58
362/23.1
(Continued)

FOREIGN PATENT DOCUMENTS

CN 101078494 A 11/2007
CN 202884797 U 4/2013
(Continued)

*Primary Examiner* — Bryon T Gyllstrom
*Assistant Examiner* — Colin J Cattanach
(74) *Attorney, Agent, or Firm* — Daniel J. Piotrowski

(57) ABSTRACT

Disclosed is an optical device (10) comprising a plurality of lenses (100) for projecting a plurality of parallel beams (202, 204) having a predetermined width towards an object area, wherein each lens comprises a lens body including a cavity (150) for housing a solid state lighting element (200); a pair of opposing internally reflecting side surfaces (130) for constraining said beam within said predetermined width; and a light exit surface delimited by said opposing side surfaces, the light exit surface comprising a curved region (110) extending from a first further side surface (141) extending between the opposing side surfaces and shaped to generate a collimated beam portion along an optical axis; and a stepped region in between the curved region and a second further side surface (142) extending between the reflecting side surfaces, wherein said steps are defined by a plurality of prismatic protrusions (120), each of said protrusions laterally extending between said opposing side surfaces. A luminaire including at least one such an optical device is also disclosed.

18 Claims, 8 Drawing Sheets

(51) Int. Cl.
*F21V 7/09* (2006.01)
*F21V 5/04* (2006.01)
*F21Y 113/10* (2016.01)
*F21Y 115/10* (2016.01)
*F21V 7/00* (2006.01)
*F21V 14/06* (2006.01)
*F21W 121/00* (2006.01)

(52) U.S. Cl.
CPC .............. *F21V 7/0091* (2013.01); *F21V 14/06* (2013.01); *F21W 2121/00* (2013.01); *F21Y 2113/10* (2016.08); *F21Y 2115/10* (2016.08)

(58) Field of Classification Search
CPC ............... F21V 5/02; F21W 2131/205; F21W 2131/202; G02B 6/0013; G02B 6/002; G02B 6/0023; G02B 6/003
See application file for complete search history.

(56) References Cited

U.S. PATENT DOCUMENTS

| | | | |
|---|---|---|---|
| 7,300,185 B1 * | 11/2007 | Ruffin | F21K 9/00 362/347 |
| 7,712,931 B1 * | 5/2010 | Smith | B60Q 1/2611 362/308 |
| 8,215,814 B2 * | 7/2012 | Marcoux | F21V 5/04 362/310 |
| 8,662,704 B2 * | 3/2014 | Carraher | F21S 8/08 362/227 |
| 9,459,436 B2 * | 10/2016 | Smith | G02B 19/0066 |
| 9,644,833 B1 * | 5/2017 | Householder | F21V 31/03 |
| 2003/0147244 A1 | 8/2003 | Tenmyo | |
| 2004/0047142 A1 | 3/2004 | Goslee | |
| 2006/0209541 A1 * | 9/2006 | Peck | F21V 7/0091 362/247 |
| 2008/0007430 A1 * | 1/2008 | Wang | B64F 1/20 340/947 |
| 2008/0038506 A1 | 2/2008 | Schumacher et al. | |
| 2010/0142200 A1 | 6/2010 | Huang | |
| 2010/0195333 A1 | 8/2010 | Schaefer et al. | |
| 2011/0317422 A1 | 12/2011 | Costello et al. | |
| 2012/0106165 A1 | 5/2012 | Chang | |
| 2013/0077320 A1 | 3/2013 | Duan et al. | |
| 2013/0155705 A1 * | 6/2013 | Peck | F21S 8/00 362/470 |
| 2013/0335979 A1 * | 12/2013 | Lauret | B64F 1/20 362/311.02 |
| 2014/0016320 A1 * | 1/2014 | Shumate | F21V 5/008 362/269 |
| 2014/0185280 A1 * | 7/2014 | Peck | F21V 5/00 362/231 |
| 2014/0192080 A1 | 7/2014 | Hunt | |
| 2015/0183525 A1 * | 7/2015 | De Jager | B64D 45/08 340/983 |

FOREIGN PATENT DOCUMENTS

| | | |
|---|---|---|
| CN | 202947076 U | 5/2013 |
| EP | 2172696 A1 | 4/2010 |
| EP | 2592334 A1 | 5/2013 |
| EP | 2594846 A1 | 5/2013 |
| WO | 2008090574 A1 | 7/2008 |
| WO | 20121188288 A2 | 9/2012 |
| WO | 2013088299 A1 | 6/2013 |

* cited by examiner

OPTICAL DEVICE AND LUMINAIRE

CROSS-REFERENCE TO PRIOR APPLICATIONS

This application is the U.S. National Phase application under 35 U.S.C. § 371 of International Application No. PCT/EP2015/050913, filed on Jan. 20, 2015, which claims the benefit of Chinese Patent Application No. PCT/CN2014/000106, filed on Jan. 27, 2014 and European Patent Application 14163336.2, filed Apr. 3, 2014. These applications are hereby incorporated by reference herein.

FIELD OF THE INVENTION

The present invention relates to an optical device for creating a weaving lighting effect.

The present invention further relates to a luminaire comprising at least one such an optical device.

BACKGROUND OF THE INVENTION

Architectural aesthetics is an important and popular industry. Nowadays, people tend to integrate lighting technology into architectural designs to create artistic lighting effects for aesthetic purposes.

One of the technical challenges associated with projecting light effects onto an object area such as an object surface is that it is not straightforward to create the desired light effect. An example of a light pattern-generating lighting device is provided in US2014/192080 A1, which discloses a lighting device including so-called gobo's to generate desired patterns. A drawback of such a device is that the gobo's block part of the emitted light to create the desired patterns, which therefore negatively affects to luminous efficiency of the device.

Another example of a lighting device for producing a weaving lighting effect is provided in US 2004/0047142 A1, which discloses an architectural mesh including a plurality of wires, where the wires are woven to form a mesh, and at least one light element interwoven with the plurality of wires in the mesh. The at least one light element includes an electroluminescent wire, plastic optical fiber, or similar device. However, this architectural mesh is relatively costly to manufacture and furthermore the integration of optical elements in the light element may be cumbersome as the light element should have a small form factor to be integrated in the architectural mesh in an unobtrusive manner, which limits the type of lighting effects that can be generated with the mesh. Moreover, the mesh is likely to at least partially cover the at least one light element, thereby at least partially blocking the emitted light and the luminous efficiency of the device.

SUMMARY OF THE INVENTION

The present invention seeks to provide a more efficient optical device for creating a weaving lighting effect by projecting light strips of predetermined width towards an object area.

The present invention further seeks to provide a luminaire including at least one such optical device.

According to an aspect, there is provided an optical device comprising a plurality of lenses for projecting a plurality of parallel beams having a predetermined width towards an object area, wherein each lens comprises a cavity for housing a solid state lighting element; a pair of opposing internally reflecting side surfaces for constraining said beam within said predetermined width; and a light exit surface delimited by said opposing side surfaces, the light exit surface comprising a curved region extending from a further surface region to a stepped region, the curved region and the stepped region each extending between the opposing internally reflecting side surfaces, wherein the curved region is shaped to generate a collimated beam portion along an optical axis and the stepped region comprises a plurality of prismatic protrusions, each of said protrusions extending between said opposing internally reflecting side surfaces.

Each lens of such an optical device is adapted to produce a plurality of parallel light strips or beams, wherein the light beam has an asymmetric light distribution in a first plane, e.g. the ZX plane in a Cartesian coordinate system, as generated by the asymmetry of the light exit surface in the ZX plane, and a symmetric light distribution in a second plane perpendicular to the first plane, e.g. the ZY plane in a Cartesian coordinate system, as generated by the symmetry of the light exit surface in the ZY plane and by the opposing side surfaces. The asymmetric light distribution may be used to illuminate a substantial part of an object area, e.g. a wall, and the symmetric light distribution may be used to create the parallel beam along the object area such that the plurality of lenses create a pattern of parallel beams having high luminous efficiency, which pattern can be used to create a weaving pattern, e.g. by using a pair of such optical devices in a configuration wherein the parallel beams generated by the respective optical devices cross each other.

In an embodiment, said optical axis is oriented under a non-perpendicular angle with a bottom plane of said optical device in order to create a plurality of angled parallel light beams.

The plurality of lenses may comprise a first group of lenses and a second group of lenses, wherein the respective optical axes of the first curved regions of the first group of lenses intersect the respective optical axes of the first curved regions of the second group of lenses. This allows for the creation of a weaved lighting effect using a single optical device only.

At least some of the lenses of the first group of lenses may abut a lens of the second group of lenses such that respective side surfaces of the abutting lenses are facing each other. This yields a particular compact optical device in which abutting lenses may be formed in a single molding step, thus reducing the manufacturing cost of the optical device.

In an embodiment, the lenses are mounted on a carrier to support the lenses. At least some of the lenses may be mounted on a rotatable body on the carrier, thereby creating an additional variable in the lighting pattern to be generated, as the rotatable body may be rotated to alter the direction in which the light pattern is generated. This for instance relaxes the installation constraints of such an optical device, because the optical device does not need to be accurately aligned respective to the object surface, as misalignment may be corrected by rotating the lenses to their appropriate positions using the respective rotatable bodies on which the lenses are mounted.

Each side surface may comprise a planar section extending from the light exit surface and a curved section extending from the planar section towards the cavity, at least the curved section defining a total internal reflection surface. This configuration is particularly suitable to ensure a constrained light beam in the ZY plane as previously mentioned.

The curved region may have a convex light exit surface to generate the desired luminous distribution.

The stepped region may be a curved stepped region to generate the desired luminous distribution.

Each internally reflecting side surface may be covered by a reflective material in order to achieve the desired (total) internal reflection from said side surfaces.

According to another aspect, there is provided a luminaire comprising at least one optical device according to one or more of the aforementioned embodiments and a plurality of solid state lighting elements, wherein each solid state lighting element is mounted in one of said cavities, and wherein the lenses of the at least one optical device are arranged in a first group of lenses and a second group of lenses, wherein the respective optical axes of the first curved regions of the first group of lenses intersect the respective optical axes of the first curved regions of the second group of lenses. Such a luminaire is adapted to generate a weaving light pattern with high luminous efficiency.

The solid state lighting elements mounted in the first group of lenses may produce light having a first colour, and the solid state lighting elements mounted in the second group of lenses may produce light having a second colour, wherein the first colour is different to the second colour in order to further enhance the aesthetic appeal of the weaving light pattern, for instance because colour mixing at the intersection of the beams generated by the first and second groups of lenses respectively will create a multi-coloured weaving light pattern that may be particularly appealing to at least some observers.

The first group of lenses and the second group of lenses may form part of the same optical device such that the luminaire can generate the weaving light pattern with a single optical device.

Alternatively, the luminaire may comprise a first optical device including the first group of lenses and a second optical device including the second group of lenses for generating the weaving light pattern.

In an embodiment, the first optical device is oriented relative to the second optical device under a certain angle to generate a weaving light pattern with non-perpendicularly intersecting light beams, which may be particularly aesthetically pleasing.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
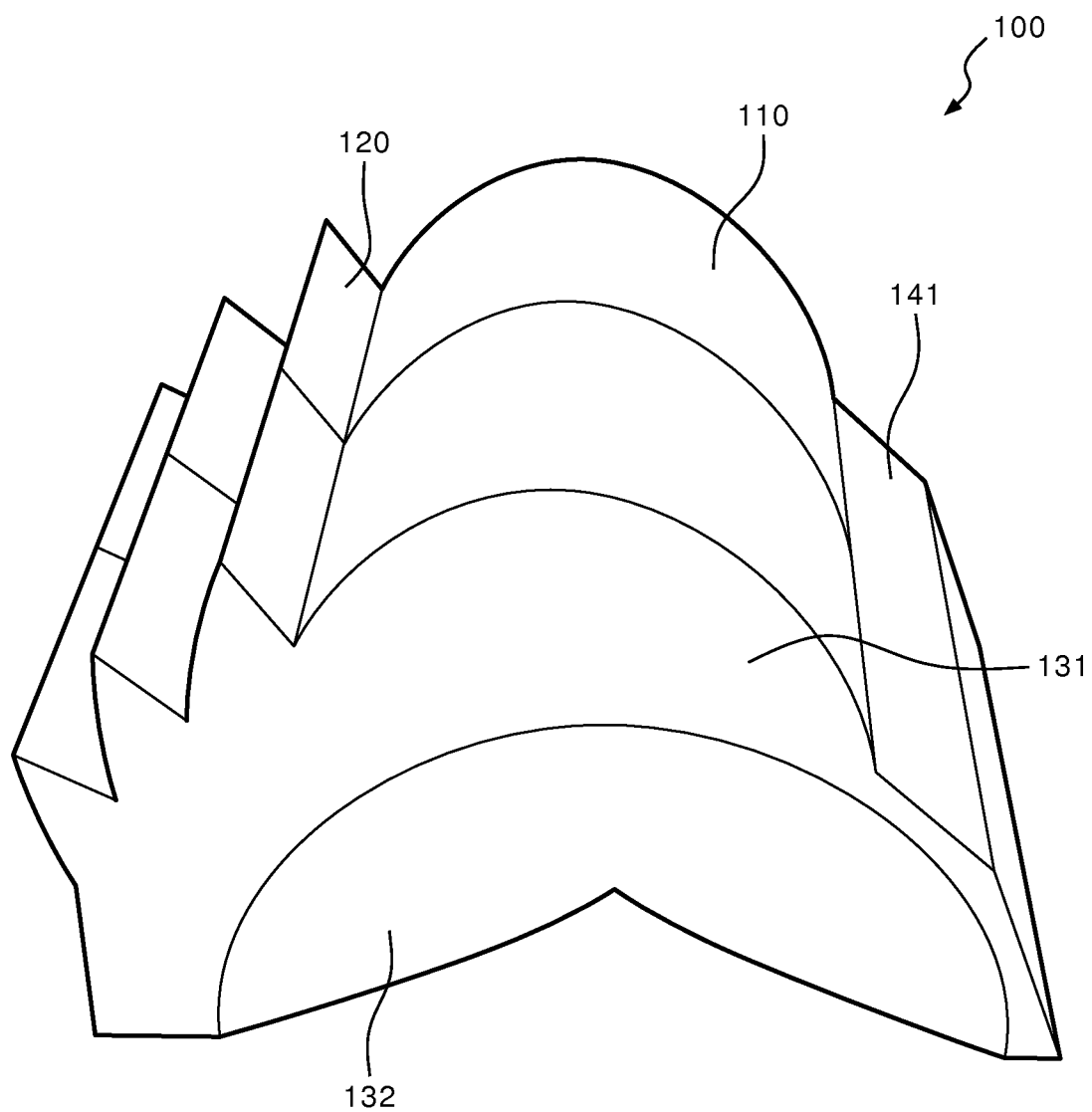
FIG. 1-4 schematically depict various views of a lens of an optical device according to an embodiment.
Figure 2:
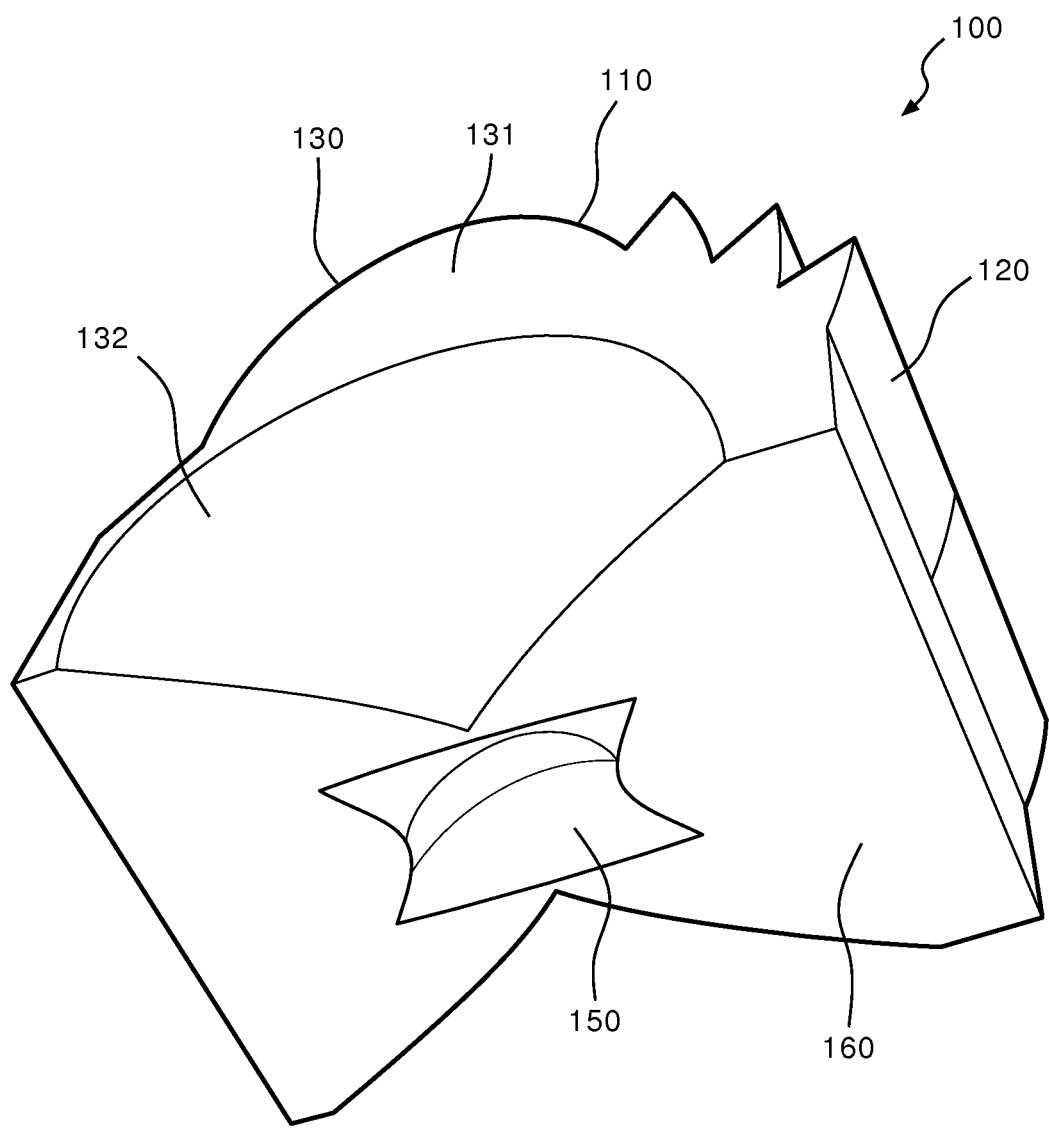
Figure 3:
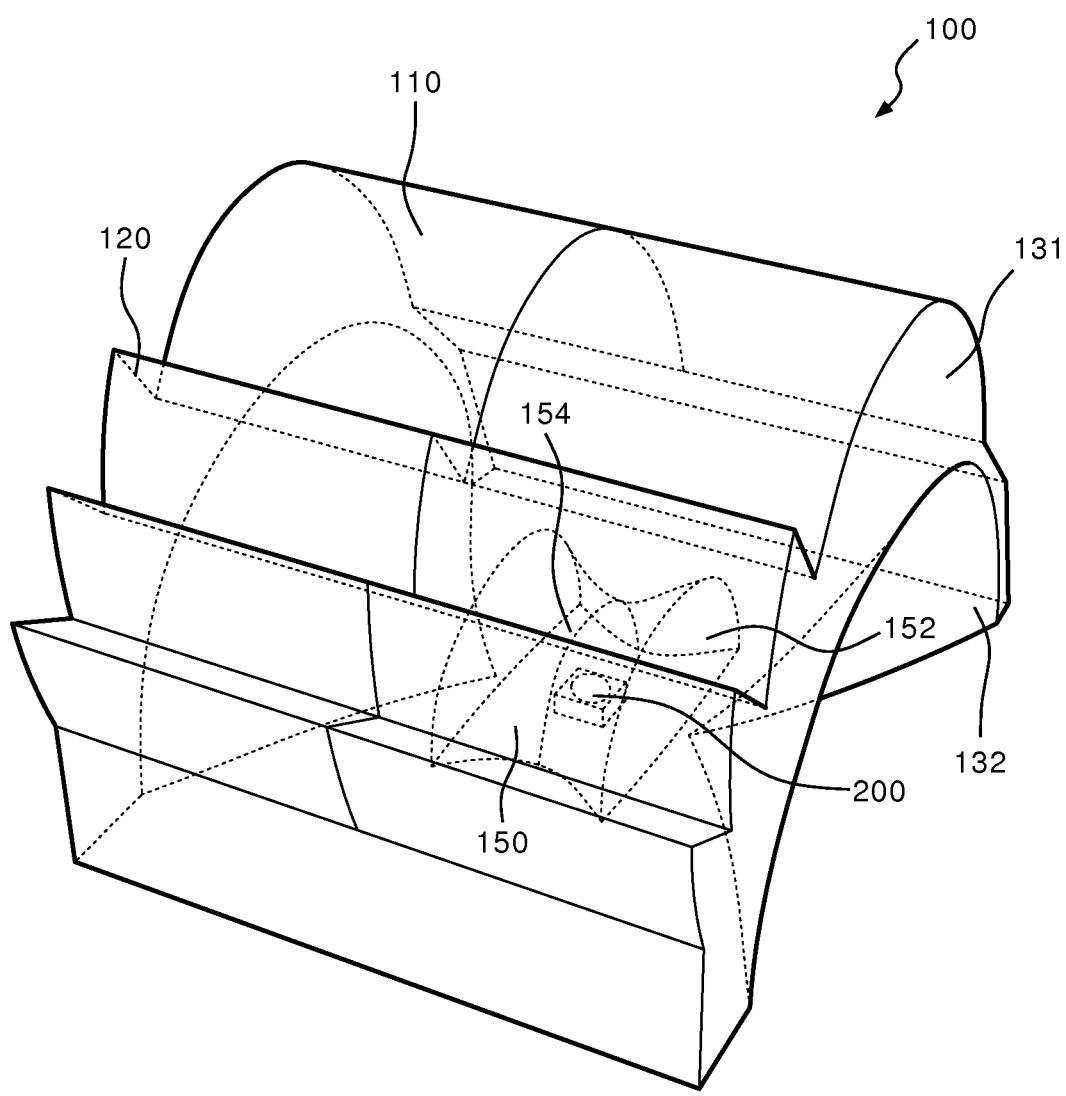

It should be understood that the Figures are merely schematic and are not drawn to scale. It should also be understood that the same reference numerals are used throughout the Figures to indicate the same or similar parts.

FIG. 1-4 schematically depict various views of a lens 100 for an optical device according to an embodiment. The lens 100 typically comprises a cavity 150 for housing a solid state lighting (SSL) element 200 such as a light emitting diode (LED). Any suitable type of LED may be used for this purpose. The cavity 150 may have an inner surface comprising two opposing flat side surfaces 152 adjoined by a refractive curved surface 154, e.g. a convex surface, which is shaped to collimate at least a central portion of the light distribution produced by the LED 200, e.g. light emitted under an angle ranging from 0° to 30° relative to the optical axis of the SSL element 200, although other ranges are equally feasible. The inner surface of the cavity 150 or at least the refractive curved surface 154 may be a saddle surface. Light emitted by the SSL element 200 under angles outside this range, e.g. 60-90°, is first refracted by the side surfaces 152 and subsequently reflected by the internally reflecting side surface portions 131 and/or 132, which will be described in more detail below.

It should be understood that the side surfaces 152 are chosen to be flat for ease of manufacturing. In particular, such flat surfaces facilitate the release of the lens 100 for a mould in which the lens has been moulded, for instance when the lens 100 is made of a mouldable material, e.g. an optical grade polymer such as polycarbonate, polyethylene terephthalate, poly (methyl methacrylate) and so on. It is however noted that the lens 100 may be made of any suitable material, e.g. glass, polymer or the like and that the side surfaces 152 may have any suitable shape.

Figure 4:
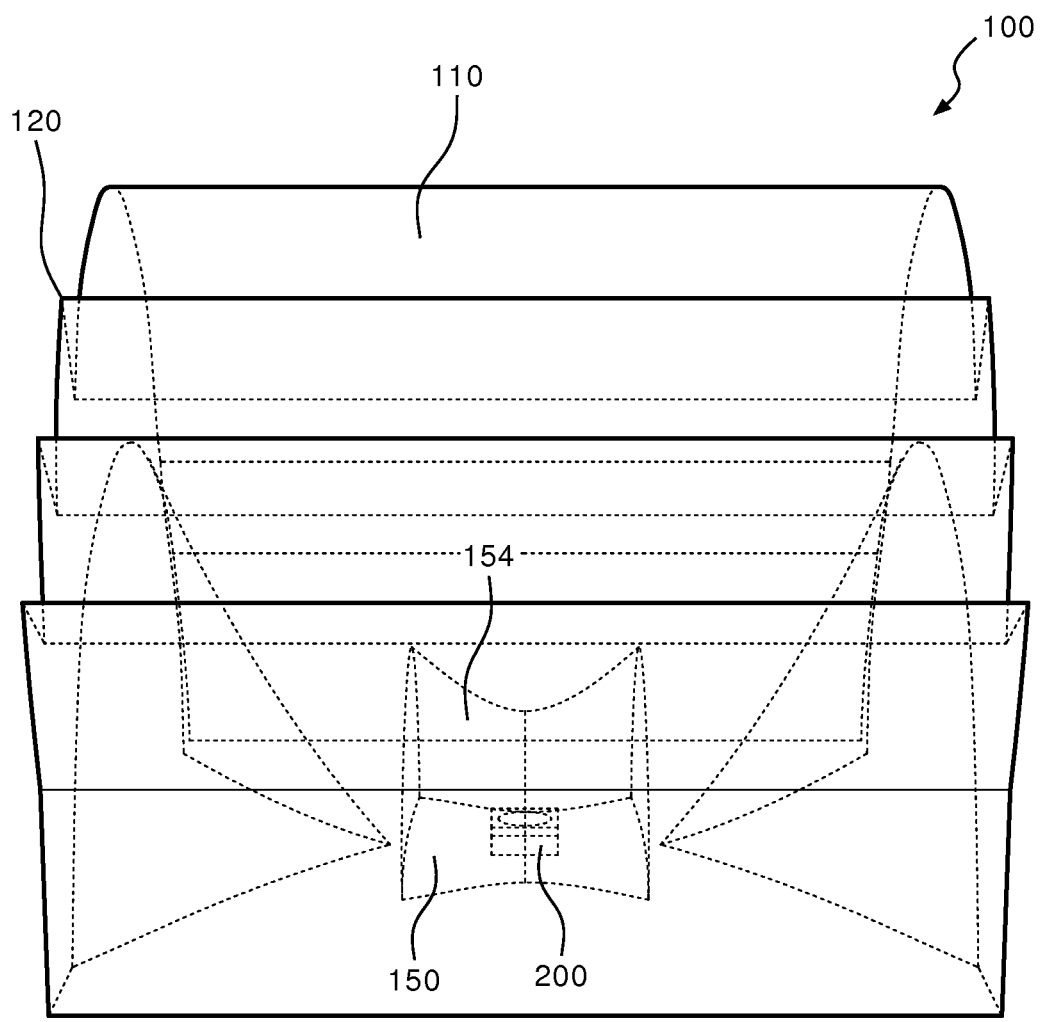

The outer surface of the lens 100 is shaped to create a collimated luminous output in a first plane and a diverging luminous output in a second plane perpendicular to the first plane. FIG. 1 schematically depicts a planar view of the lens 100 in the plane in which the diverging luminous output is produced, which plane will be referred to as the ZX plane, whereas FIG. 4 schematically depicts a planar view of the lens 100 in the plane in which the collimated luminous output is produced, which plane will be referred to as the ZY plane, which nomenclature refers to a Cartesian coordinate system in which the bottom surface 160 of the lens 100 is placed on the XY plane. To this end, the external surface of the lens 100 is asymmetrical along the X-axis but symmetrical along the Y-axis.

As shown in FIG. 1-4, the light exit surface of the lens 100 consists of two adjoining portions having different shapes, namely a curved region 110 and a stepped or jagged region comprising a plurality of prismatic protrusions 120, e.g. Fresnel-type prisms. The stepped region including the plurality of prismatic protrusions 120 greatly reduces the overall size of the lens 100 compared to a lens including a further curved surface portion instead, as for such a further curved surface portion to create the same optional function as the stepped region, the further curved surface portion would have to be raised to a significantly greater height than the stepped region, thereby causing the lens, and an optical device including such lenses to have a significantly increased size.

The curved region 110 and the stepped region comprising a plurality of prismatic protrusions 120 extend along the Y-axis between opposing side surfaces 130. The stepped region may follow the curvature of the curved region 110 along the X-axis such that the prismatic protrusions 120 extend from a curved surface that may be considered an extension of the curved region 110.

In an embodiment, the opposing side surfaces 130 each comprise a planar surface portion 131 and a total internal reflection surface portion 132, wherein the planar surface portion 131 separates the light exit surface from the total internal reflection surface portion 132. The total internal reflection surface portion 132 may be a curved surface portion, e.g. a concave surface portion such as a conicoid surface portion that curves inwardly from the side surface portion 131 towards one of the flat side surfaces 152 of the cavity 150, e.g. for collimating the part of the luminous distribution of the SSL element 200 that has evaded the refractive curved surface 154. In an embodiment, the planar surface portions 131 may also be internally reflecting, e.g. total internal reflecting surface portions. The opposing side surfaces 130 or parts thereof may be covered by a reflective material to achieve the desired reflective properties of these surfaces or parts thereof. Any suitable reflective material, e.g. a reflective foil or paint, may be used for this purpose.

The curved portion 110 of the light exit surface may extend along the X-axis between the stepped region and a further surface region 141 extending between the opposing side surfaces 131. The further surface region 141 is shown as a flat region in FIG. 1-4 but it should be understood that the further surface region 141 may have any suitable shape; the further surface region 141 may be another stepped region for instance, as long as the overall shape of the light exit window remains asymmetric.

The curved portion 110 of the light exit surface may have a convex shape to project light towards a relatively farther area of a target surface such as a wall, ceiling of the like, while the stepped or jagged portion of the light exit surface including the prismatic protrusions 220 is designed to project light towards a nearer area of the target surface. This asymmetrical aspect of the lens 100 is depicted in FIG. 1 as previously mentioned. In an embodiment, the light projected by the curved portion 110 has substantially the same intensity as the light projected by the stepped portion including the prismatic protrusions 220. This ensures that an elongated light beam having a homogenous intensity appearance is projected onto the target surface by the lens 100. At the same time, the spreading of the elongated light beam normal to the direction of elongation is prevented by the symmetrical aspect of the light exit surface of the lens 100 in the ZY plane combined with the opposing internally reflecting side surfaces 130. In this context, the symmetrical aspect is characterized in that a plane of symmetry perpendicular to the ZY plane exists for the lens 100. This symmetrical aspect of the lens 100 is depicted in FIG. 4 as previously mentioned.

In other words, the asymmetrical structure of the lens 100 is to obtain a uniform light distribution over an elongated area having a substantially constant width, e.g. a collimated elongated light beam. Hence, in an optical device comprising a plurality of such lenses 100, e.g. oriented in an array, a plurality of parallel elongated light beams may be created for creating a weaving light pattern, e.g. by intersecting the light beams with further light beams of a further optical device comprising a further plurality of the lenses 100 or by including a further plurality of lenses 100 in the optical device that are oriented to create the intersecting light beams. This will be explained in more detail below.

Figure 5:
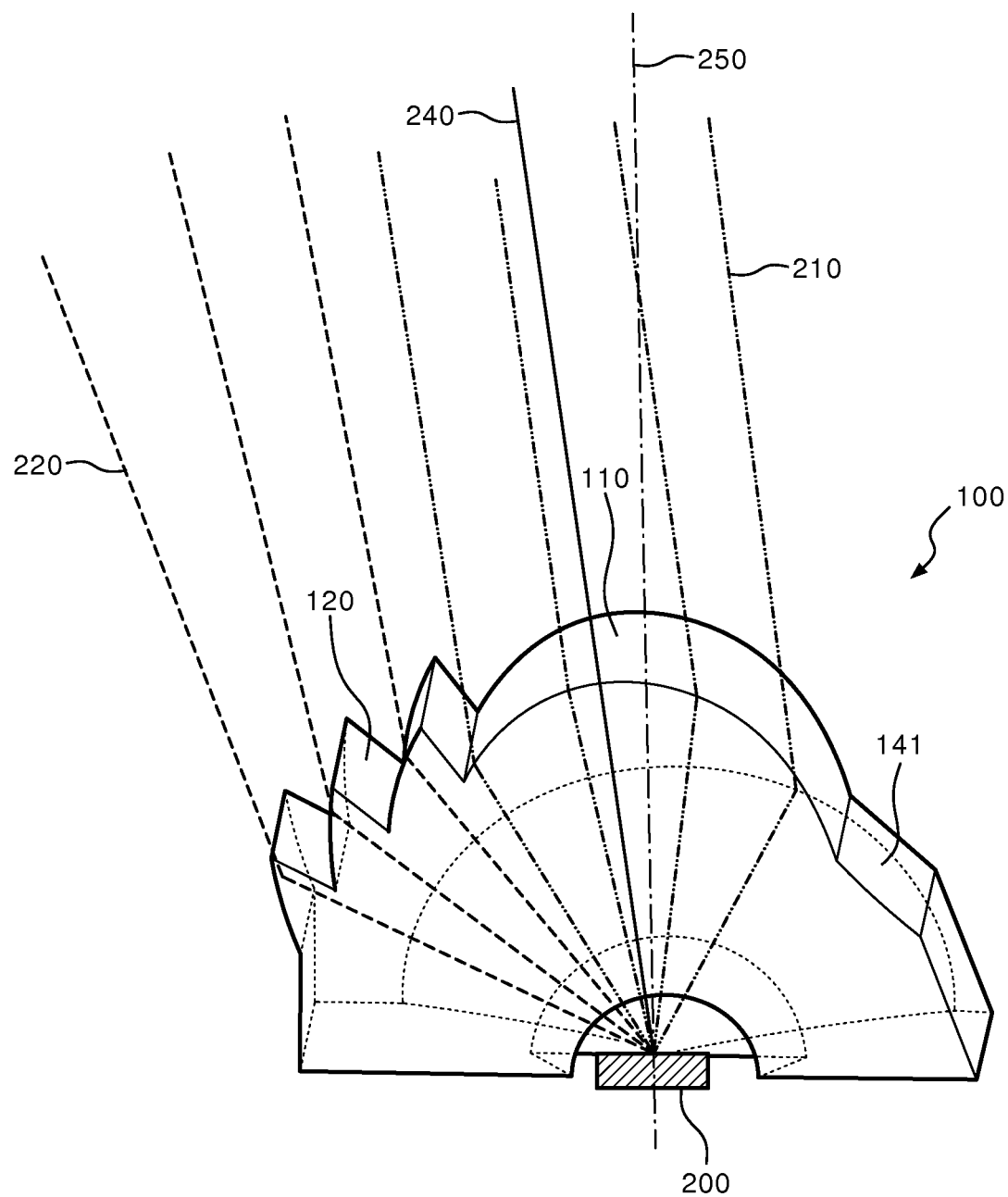
FIG. 5 schematically depicts a light distribution produced with a lens of an optical device according to an embodiment.

The optical operation of an embodiment of the lens 100 will now be explained in more detail with the aid of FIG. 5, which schematically depicts a perspective view of the lens 100 in the ZX plane, with the Z-axis labeled 250, and the luminous output produced by the lens 100 from the luminous output of SSL element 200.

In this embodiment, the curved surface portion 110 of the light exit surface of the lens 100 may refract light from the SSL element 200 along an optical axis 240, e.g. to produce a luminous distribution 210 under an angle of 30° to 60° relative to the Z-axis 250, while the stepped surface portion including the prismatic protrusions 120 may refract light from the SSL element 200 to produce a luminous distribution 220 under an angle of 60° to 120° relative to the Z-axis 250. However, it should be understood that these luminous distribution ranges are provided by way of example only, and that the skilled person in the field may modify the angular ranges of the luminous distributions 210 and/or 220 to meet different requirements. For example, the stepped portion may be designed to produce a light distribution 220 ranging from 30° to 90°, whilst the convex portion 110 may be designed to produce a light distribution 210 ranging from 60° to 150°. In other words, the angular distribution and range of these two portions of the light exit surface may be varied according to specific situations, such as the distance between the optical device and the object area onto which the light beams are to be projected.

Figure 6:
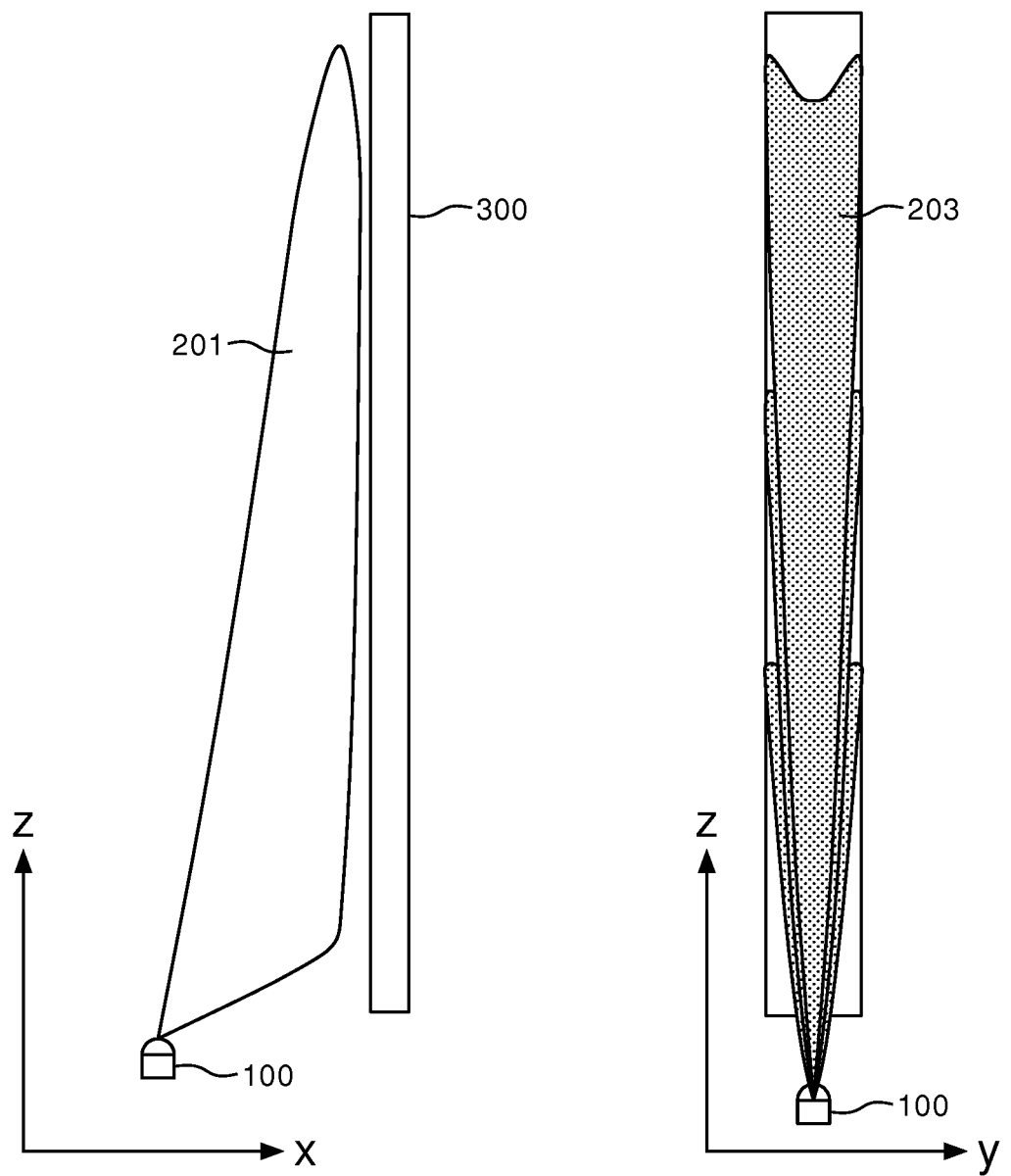
FIG. 6 schematically depict light distributions produced in different planes with a lens of an optical device according to an embodiment.

The resulting beam shape in the ZX and ZY planes respectively is schematically depicted in FIG. 6, which shows that in the ZX plane the asymmetric shape of the light exit window creates an asymmetric elongated beam portion 201 along an object surface 301, e.g. a wall surface, whereas in the ZY plane the beam portion 203 has a substantially constant width along its elongated length, thereby demonstrating that the lens 100 is capable of producing an elongated projection of substantially constant width onto a target surface, which is particularly suitable for creating weaving light patterns as will be explained in more detail below.

Figure 7:
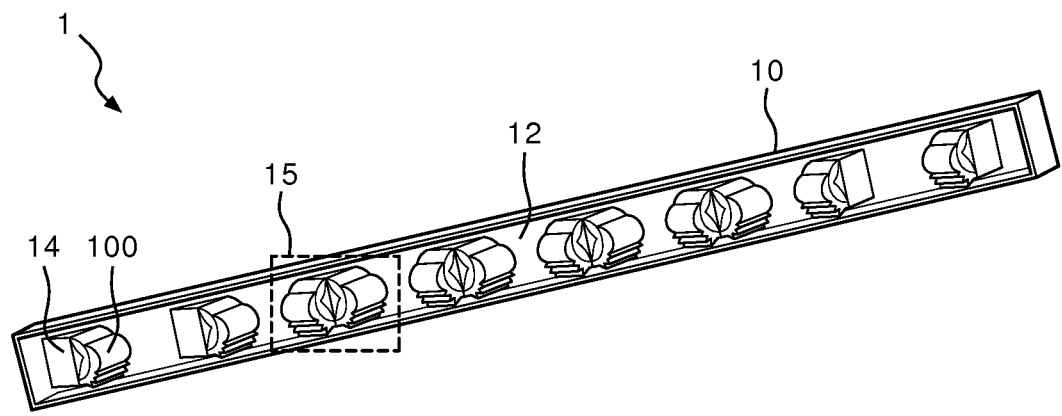
FIG. 7 schematically depicts a luminaire including an optical device according to an embodiment.

FIG. 7 schematically depicts a luminaire 1 comprising an optical device 10 including a plurality of lenses 100 according to an embodiment of the present invention. The lenses 100 are mounted on a carrier 12, which may be any suitable carrier made of any suitable material. A box-shaped carrier 12 housing the lenses 100 is shown by way of non-limiting example only. In the embodiment of the optical device 10 shown in FIG. 7, the plurality of lenses 100 is divided in a first group of lenses 100 and a second group of lenses 100, wherein the lenses 100 of the first group are oriented to generate their respective elongated light beams in a first direction and the lenses 100 of the second group are oriented to generate their respective elongated light beams in a second direction that intersects the first direction such that the weaving light pattern as shown in FIG. 8 is generated.

Figure 8:
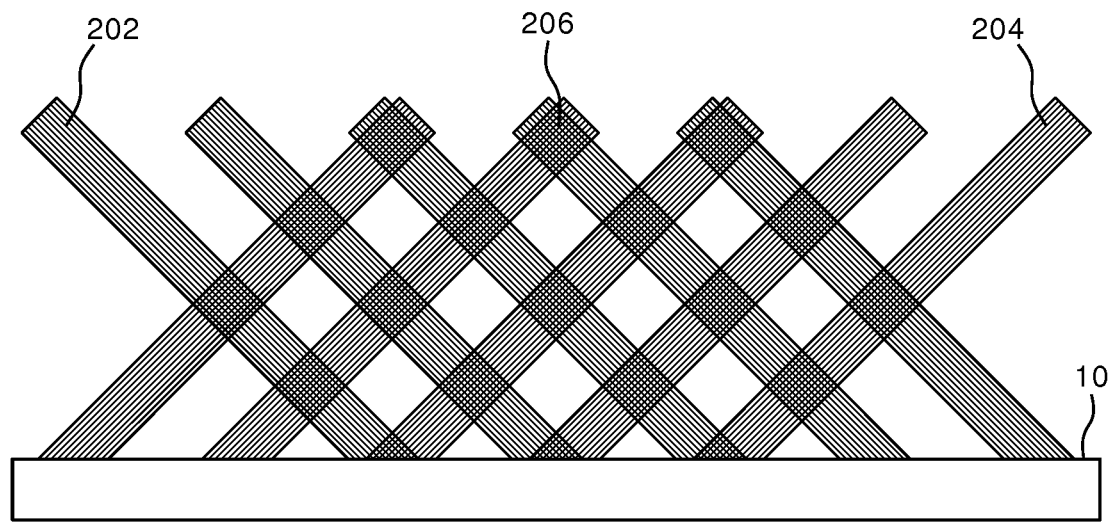
FIG. 8 schematically depicts a weaving light pattern produced by the luminaire of FIG. 7.

In FIG. 8, the first group of lenses 100 of the optical device 10 are arranged to generate light beams 202 and the second group of lenses 100 of the optical device 10 are arranged to generate further light beams 204, which light beams 202 and further light beams 204 intersect in intersecting regions 206. In an embodiment, the first group of lenses shape the light of a first group of SSL elements 200 into the light beams 202 and the second group of lenses shape the light of a second group of SSL elements 200 into the further light beams 204, wherein the first group of SSL elements 200 is arranged to generate light of a first colour and the second group of SSL elements 200 is arranged to generate light of a second colour, which is different to the first colour. This facilitates the creation of a particularly appealing weaving light pattern in which the intersecting regions 206 have a third colour that is the result of the mixing of the first colour with the second colour. It will of course be understood that each group of SSL elements may be arranged to produce multiple colours to create even more elaborate weaving light patterns.

As schematically shown in FIG. 7, at least some of the lenses 100 may be mounted on a rotatable body 14 on the carrier 12 such that the direction of the elongated light beams generated by these lenses may be adjusted by rotating the rotatable body 14. In an embodiment, the rotatable body 14 may be rotatable over a range of 360°, i.e. fully rotatable, although it should be understood that it is equally feasible that the rotation range of the rotatable body 14 is more limited. The rotatable body 14 may be controlled by a remote control (not shown) such that an observer of the luminaire 1 may remotely adjust the light pattern generated by the luminaire 1. Each rotatable body 14 may be individually controllable. Alternatively, a group of rotatable bodies 14 may be controlled by a single control signal such that the orientation of the lenses 100 within the group relative to each other is maintained. In an embodiment, the rotatable bodies 14 may be automatically controlled, e.g. by a computer, microcontroller or the like to create a dynamic weaving light pattern, i.e. a weaving light pattern that changes over time.

In an embodiment, a lens 100 from the first group and a lens 100 from the second group may be formed as a single unit 15 in which the lens 100 from the first group abuts the lens 100 from the second group, and the respective side surfaces 130 of the abutting lenses 100 are facing each other. This has the advantage that the opposing lenses 100 in the unit 15 may be formed in a single manufacturing step, thus reducing cost. Moreover, the relative orientation of these lenses required to generate the weaving light pattern is guaranteed within the single unit 15, which significantly simplifies the alignment process of the lenses 100 on the carrier 12 of the optical device 10.

Figure 9:
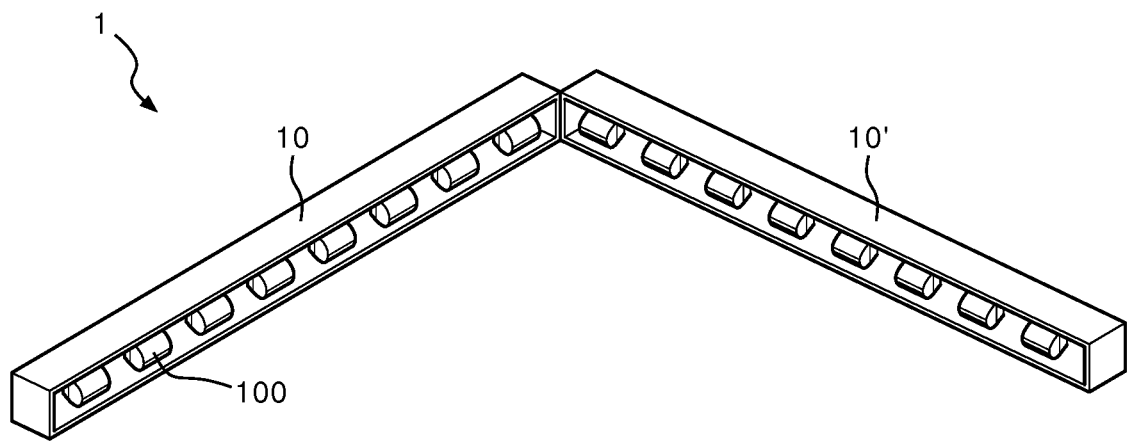
FIG. 9 schematically depicts a luminaire including a pair of optical devices according to another embodiment.

In FIG. 8, it can be seen that the respective lenses 100 generate their luminous output under a non-zero angle with the normal to the carrier 12. However, it is equally feasible to provide a luminaire 1 in which the luminous output of the lenses 100 is aligned alongside this normal. An embodiment of such a luminaire 1 is schematically depicted in FIG. 9, in which the luminaire 1 comprises a first optical device 10 and a second optical device 10'. In this embodiment, the first optical device 10 comprises the previously described first group of lenses 100 and first group of SSL elements 200 and the second optical device 10' comprises the previously described second group of lenses 100 and second first group of SSL elements 200.

Figure 10:
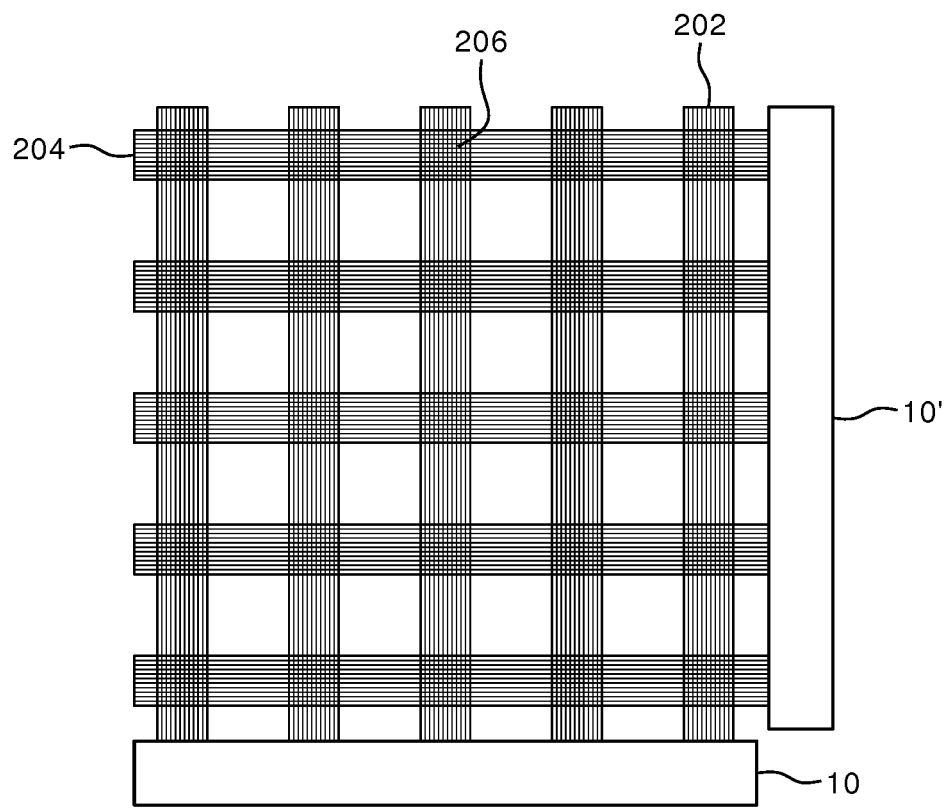
FIG. 10 schematically depicts a weaving light pattern produced by the luminaire of FIG. 9.

The first optical device 10 is typically placed under a certain angle with the second optical device 10', i.e. under a non-zero angle, e.g. a perpendicular angle, to generate the weaving light pattern as schematically shown in FIG. 10, in which the first group of lenses 100 of the first optical device 10 are arranged to generate light beams 202 and the second group of lenses 100 of the second optical device 10' are arranged to generate further light beams 204, which light beams 202 and further light beams 204 intersect in intersecting regions 206.

In FIGS. 9 and 10, the first optical device 10 is placed in a perpendicular orientation relative to the second optical device 10' by way of non-limiting example only. It should be understood that the first optical device 10 may be placed under any suitable non-zero angle relative to the second optical device 10'. In an embodiment, the orientation of at least one of the first optical device 10 and the second optical device 10' may be adjustable, e.g. by means of a remotely controlled telescopic arm or any other suitable adjustment means, such that an observer of the weaving light pattern may adjust the shape of the weaving light pattern by adjusting this orientation. In an embodiment, the adjustment may be automatically controlled, e.g. by a computer, microcontroller or the like to create a dynamic weaving light pattern.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An optical device having a bottom plane and comprising a plurality of lenses for projecting a plurality of parallel beams having a predetermined width towards an object area, wherein each lens comprises:
   a cavity for housing a solid state lighting element;
   a pair of opposing internally reflecting side surfaces for constraining said beam within said predetermined width; and
   a light exit surface delimited by said opposing side surfaces, the light exit surface comprising:
   a curved region extending from a further surface region to a stepped region, the curved region and the stepped region each extending between the opposing internally reflecting side surfaces, wherein the curved region is shaped to generate a collimated beam portion along an optical axis, said axis not being parallel to the bottom plane, and the stepped region comprises a plurality of prismatic protrusions, each of said protrusions extending between said opposing internally reflecting side surfaces, and each of said protrusions comprising a prism structure that refracts light emitted from the solid state light element;
   wherein the curved region has an outer surface distal from the bottom plane, said outer surface having a maximum distance as measured along a vertical line to the bottom plane; and,
   wherein each location of the step region has a distance, as measured along a line vertical to the bottom plane, that is less than said maximum distance.

2. The optical device of claim 1, wherein said optical axis is oriented at an acute angle relative to the bottom plane of said optical device.

3. The optical device of claim 2, wherein the plurality of lenses comprises a first group of lenses and a second group of lenses, wherein the respective optical axes of the first curved regions of the first group of lenses intersect the respective optical axes of the first curved regions of the second group of lenses.

4. The optical device of claim 3, wherein at least some of the lenses of the first group of lenses abut a lens of the second group of lenses such that respective side surfaces of the abutting lenses are facing each other.

5. The optical device claim 1, wherein the lenses are mounted on a carrier.

6. The optical device of claim 5, wherein at least some of the lenses are mounted on a rotatable body on the carrier.

7. The optical device of claim 1, wherein each internally reflecting side surface comprises a planar section extending from the light exit surface and a curved section extending from the planar section towards the cavity, at least the curved section defining a total internal reflection surface.

8. The optical device of claim 1, wherein the curved region has a convex light exit surface.

9. The optical device of claim 1, wherein the stepped region is a curved stepped region.

10. The optical device of claim 1, wherein each internally reflecting side surface is covered by a reflective material.

11. A luminaire comprising at least one optical device according to claim 1 and a plurality of solid state lighting elements, wherein each solid state lighting element is mounted in one of said cavities, and wherein the lenses of the at least one optical device are arranged in a first group of lenses and a second group of lenses, wherein the respective optical axes of the first curved regions of the first group of lenses intersect the respective optical axes of the first curved regions of the second group of lenses.

12. The luminaire of claim 11, wherein the solid state lighting elements mounted in the first group of lenses produce light having a first colour, and the solid state lighting elements mounted in the second group of lenses produce light having a second colour, wherein the first colour is different to the second colour.

13. The luminaire of claim 11, wherein the first group of lenses and the second group of lenses form part of the same optical device.

14. The luminaire of claim 11, comprising a first optical device including the first group of lenses and a second optical device including the second group of lenses.

15. The luminaire of claim 14, wherein the first optical device is oriented relative to the second optical device under a certain angle.

16. An optical device comprising a plurality of lenses for projecting a plurality of parallel beams having a predetermined width towards an object area, wherein each lens comprises:
a cavity for housing a solid state lighting element;
a pair of opposing internally reflecting side surfaces for constraining said beam within said predetermined width; and
a light exit surface delimited by said opposing side surfaces, the light exit surface comprising:
a curved region extending from a further surface region to a stepped region, the curved region and the stepped region each extending between the opposing internally reflecting side surfaces, wherein the curved region is shaped to generate a collimated beam portion along an optical axis and the stepped region comprises a plurality of prismatic protrusions, each of said protrusions extending between said opposing internally reflecting side surfaces, and each of said protrusions comprising a prism structure that refracts light emitted from the solid state light element;
wherein the optical axis produces a luminous distribution under an angle of 30° to 60° of said axis relative to a perpendicular to a bottom plane;
wherein the curved region has an outer surface distal from the bottom plane, said outer surface having a maximum distance as measured along a vertical line to the bottom plane; and,
wherein each location of the step region has a distance, as measured along a line vertical to the bottom plane, that is less than said maximum distance.

17. The optical device of claim 1, wherein at least one of said protrusions comprises a Fresnel-type prism.

18. The optical device of claim 16, wherein at least one of said protrusions comprises a Fresnel-type prism.

* * * * *